(12) United States Patent
Krywitsky

(10) Patent No.: US 8,157,295 B2
(45) Date of Patent: Apr. 17, 2012

(54) ARTICULATING JOINT WITH INJECTOR PORT

(75) Inventor: Lee A. Krywitsky, Calgary (CA)

(73) Assignee: Hiltap Fittings, Ltd., Calgary, Alberta (CA)

( * ) Notice: Subject to any disclaimer, the term of this patent is extended or adjusted under 35 U.S.C. 154(b) by 120 days.

(21) Appl. No.: 12/396,916

(22) Filed: Mar. 3, 2009

(65) Prior Publication Data
US 2009/0226243 A1  Sep. 10, 2009

Related U.S. Application Data

(60) Provisional application No. 61/033,835, filed on Mar. 5, 2008.

(51) Int. Cl.
*F16L 27/04* (2006.01)
(52) U.S. Cl. .......................... 285/271; 285/263
(58) Field of Classification Search ............. 285/90, 285/96, 97, 98, 121.7, 121.6, 261, 263, 270, 285/271
See application file for complete search history.

(56) References Cited

U.S. PATENT DOCUMENTS

| | | | | | |
|---|---|---|---|---|---|
| 790,118 | A | * | 5/1905 | Everson | 285/271 |
| 846,704 | A | * | 3/1907 | Stucy | 285/17 |
| 908,414 | A | * | 12/1908 | Mellin | 285/121.7 |
| 1,197,588 | A | * | 9/1916 | Austin | 285/270 |
| 1,346,524 | A | * | 7/1920 | Bard | 285/271 |
| 2,383,679 | A | * | 8/1945 | Phillips | 285/271 |
| 2,506,096 | A | * | 5/1950 | Marshall | 285/266 |
| 3,663,043 | A | * | 5/1972 | Walton | 285/113 |
| 3,746,372 | A | * | 7/1973 | Hynes et al. | 285/95 |
| 3,957,291 | A | * | 5/1976 | Edling et al. | 285/121.7 |
| 4,154,551 | A | * | 5/1979 | Petrie | 405/159 |
| 4,186,950 | A | * | 2/1980 | Billingsley et al. | 285/270 |

* cited by examiner

*Primary Examiner* — Aaron Dunwoody
(74) *Attorney, Agent, or Firm* — Workman Nydegger

(57) ABSTRACT

A pipe coupling connects two fluid system components, such as two pipes, so that fluid can flow therethrough. The coupling is a ball and socket type articulating joint that is configured to allow one or both of the connected pipes to move relative to one another without compromising the integrity of the fluid system. The pipe coupling includes a sealing compartment in which packing material is disposed. The packing material can limit or prevent the development of leak between the components of the pipe coupling. The pipe coupling includes an injector port that can be used to inject additional packing material into the sealing compartment to repair any developed leaks.

20 Claims, 3 Drawing Sheets

ARTICULATING JOINT WITH INJECTOR PORT

CROSS-REFERENCE TO RELATED APPLICATIONS

This application claims priority to and the benefit of U.S. Provisional Patent Application Ser. No. 61/033,835, entitled T-BALL SWIVEL WITH INJECTOR PORT, filed Mar. 5, 2008, which is hereby incorporated herein by reference in its entirety.

BACKGROUND OF THE INVENTION

1. The Field of the Invention

The present invention relates generally to fluid system components. More particularly, embodiments of the present invention relate to fluid system components configured to allow for relative articulation of connected fluid system components while also preventing fluid system leaks.

2. The Relevant Technology

Oil sands, tar sands, or extra heavy oil is a type of bitumen. The sands are naturally occurring mixtures of sand or clay, water, and an extremely dense and viscous form of petroleum called bitumen. Oil sands are a major source of non-conventional oil. Conventional crude oil is normally extracted from the ground by drilling oil wells into a petroleum reservoir and allowing the oil to flow into them under natural reservoir pressures. In contrast, bitumen flows very slowly, if at all, toward producing wells under normal reservoir conditions. Thus, bitumen must be extracted by other methods.

One method for facilitating extraction of bitumen is to inject steam down a pipe to heat the bitumen, thereby reducing the bitumen's viscosity or thermally "thinning" the bitumen. Once the bitumen is thinned, it flows more easily and can be recovered through the same pipe used to introduce the steam, or it may be recovered through a separate pipe.

Hard piping may be used from the surface to introduce and deliver the steam to the bitumen, as well as to channel the bitumen out of the ground. The hard piping on the surface may be bolted to concrete supports. This fixed surface piping can be connected to down-hole piping, which may have been slant hole drilled. To reach the underground bitumen, these pipes can extend over lengths greater than 1,000 feet.

Heating of the bitumen as described above can introduce significant challenges. For instance, as steam is introduced, and as the bitumen is heated, the added heat is transferred to the piping. When heated, the pipes thermally expand and thus physically grow in length. Accordingly, a heated pipe (e.g., at 400° C.) may grow 4-5 feet over its entire length. As a result, the down-hole pipe may expand and end up protruding several feet out of the ground, either straight up or vectored at an angle. The challenge comes in connecting the fixed surface pipes to the down-hole pipes in such a way that allows the down-hole pipes to expand and articulate relative to the fixed surface pipes without compromising the integrity of the pipes as they move and expand relative to each other.

Other challenges are faced with the development of the oil sands. Because the bitumen is mixed with secondary materials, such as sand and clay, the secondary materials are extracted with the bitumen. These secondary materials are often hard and coarse. As these materials flow through piping, their rough edges can scrape and score the inner surfaces of the piping system. These abrasions can be particularly troublesome at joints and seals in the piping system. As the materials continue to flow, the abrasions near the joints and seals become deeper. Eventually the abrasions can become deep enough to cause the joints and seals to leak or fail entirely.

When a leak is detected, the system must be shut down and repaired. Shutting down the system to repair a leak can be extremely costly, both in terms of time and lost production. In a typical extraction system, once the flow of material has been shut off, the pipes must be allowed to cool. After the pipes have cooled and returned to their normal length, the joints and seals can be repaired. However, it can take several days for the pipes to cool enough so that the joints or seals can be repaired or replaced. The entire time the system is cooling and being repaired is time the system is not producing. Additionally, typical joints and seals used in current piping systems are complex, expensive, and require significant amounts of time to install and repair.

Accordingly, what is desired is a system that maintains sealed connections between pipes while allowing the pipes to thermally expand.

BRIEF SUMMARY OF THE INVENTION

The present invention relates to pipe couplings for use in fluid transfer systems that are employed to extract materials, such as bitumen, from the earth. As noted above, the extraction of bitumen from the earth has heretofore presented significant challenges, including the thermal expansion of fluid system pipes and the development of system leaks due to the coarse nature of the materials that flow through the system.

These problems are overcome by the herein disclosed pipe coupling. Generally, the disclosed pipe coupling enables multiple parts of a fluid system to move or articulate relative to one another while maintaining a sealed fluid passageway. The disclosed pipe coupling connects two fluid system components, such as two pipes, so that fluid can flow therethrough. The coupling is an articulating joint that is configured to allow one or both of the connected pipes to move relative to one another without compromising the integrity of the fluid system. The pipe coupling also limits fluid from leaking out between the coupling components. Furthermore, the pipe coupling allows for any developed leaks to be repaired while the fluid system stays on-line.

Accordingly, one embodiment of the invention includes a pipe coupling that has first and second fluid conduit members. The first fluid conduit member can be coupled at a first end to a fluid system pipe. The second end has a spherically enlarged portion. A fluid passageway extends through the first fluid conduit member. The second fluid conduit member can also be coupled at a first end to a fluid system pipe. The second end of the second fluid conduit member is adapted to at least partially receive therein the spherically enlarged portion of the first fluid conduit member. A fluid passageway also extends through the second fluid conduit member. The second fluid conduit member has a threaded interior surface. The spherically enlarged portion and the second end of the second fluid conduit member cooperate to define a sealing compartment that is adapted to receive packing material therein. The pipe coupling also includes a sleeve with a central opening for receiving the first end of the first fluid conduit member therethrough. The sleeve has a threaded exterior surface for engaging the threaded interior surface of the second fluid conduit member to secure the spherically enlarged portion within the second end of the second fluid conduit member. Further, the pipe coupling also includes an injector port that is in fluid communication with the sealing compartment. The injector port is adapted to facilitate injection of additional packing material into the sealing compartment to stop any developing leaks.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the figures wherein like structures will be provided with like reference designations. It is understood that the drawings are diagrammatic and schematic representations of presently preferred embodiments of the invention, and are not limiting of the present invention nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of fluid transfer systems and bitumen extraction processes have not been described in particular detail in order to avoid unnecessarily obscuring the present invention.

The disclosed pipe coupling connects two fluid system components, such as two pipes, so that fluid can flow therethrough. The coupling is an articulating joint that is configured to allow one or both of the connected pipes to move relative to one another without compromising the integrity of the fluid system. The pipe coupling also limits fluid from leaking out between the coupling components. Furthermore, the pipe coupling allows for any developed leaks to be repaired while the fluid system stays on-line.

Figure 1:
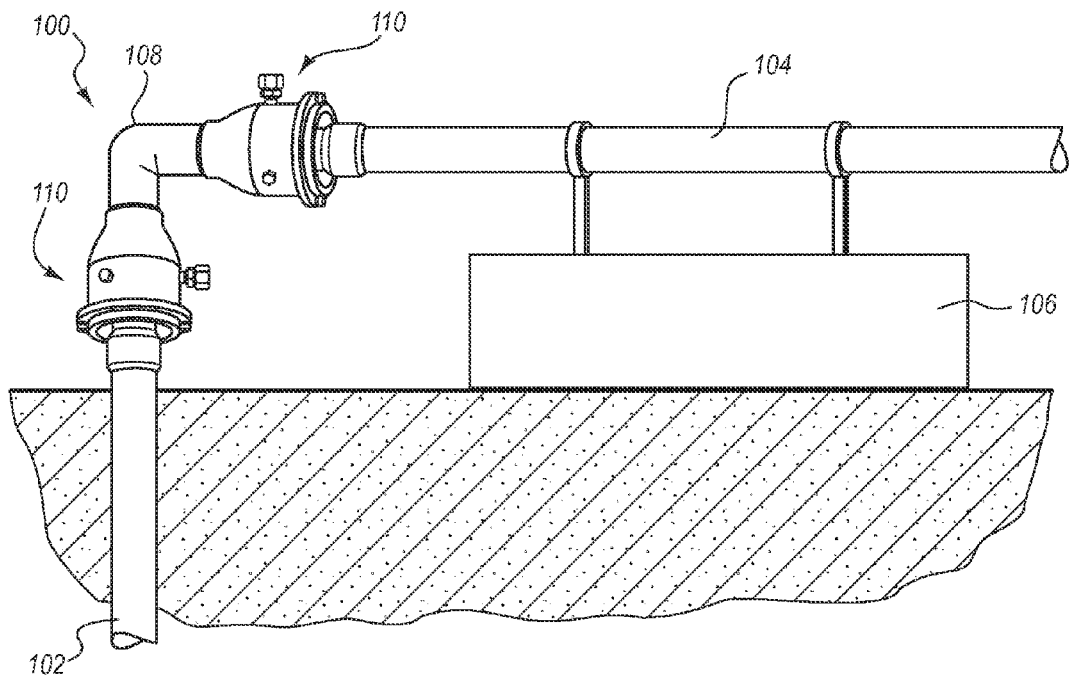
FIG. 1 depicts a fluid system employing two articulating joints according to an exemplary embodiment of the present invention.

Referring now to FIG. 1, one embodiment of a fluid transfer system is indicated generally at 100. Note that, as contemplated herein, "fluid" includes liquids, gases, liquid-gas combinations, slurries, liquid-solid combinations, gas-solid combinations, and liquid-solid-gas combinations. For instance, fluid transfer system 100 may be able to facilitate the transport of steam to an underground bitumen deposit. Similarly, fluid transfer system 100 may also, or alternatively, be able to facilitate the transport or extraction of bitumen out of the ground. Likewise, fluid transfer system 100 may be used to transport other types of materials between two or more locations. Thus, while fluid transfer system 100 will be described herein as having steam and/or bitumen flowing therethrough, it will be appreciated that fluid transfer system 100 may be used to transfer other types of material therethrough.

In the exemplary embodiment depicted in FIG. 1, fluid transfer system 100 includes a down-hole pipe 102 configured for communication with an underground bitumen deposit. Down-hole pipe 102 can be used to inject steam into the ground to thermally thin the bitumen. Bitumen can also be extracted through down-hole pipe 102. Fluid transfer system 100 also includes a surface pipe 104 configured to transfer the extracted bitumen away from down-hole pipe 102. Surface pipe 104 may be bolted to or otherwise mounted on a concrete support 106. An elbow pipe 108 is connected between down-hole pipe 102 and surface pipe 104 to allow the bitumen to flow from down-hole pipe 102 into surface pipe 104. Down-hole pipe 102 and surface pipe 104 are each connected to elbow pipe 108 by way of a pipe coupling 110.

As noted above, in order to extract bitumen from the ground it is often necessary to heat the bitumen to reduce its viscosity. One method for heating the bitumen is to inject steam through down-hole pipe 102. Once the bitumen is heated, it can be extracted through the down-hole pipe 102. The heat from the injected steam and/or the flow of the heated bitumen through down-hole pipe 102 and/or surface pipe 104 can cause down-hole pipe 102 and/or surface pipe 104 to thermally expand up to several feet. As described in greater detail below, pipe couplings 110 are configured to enable down-hole pipe 102 and/or surface pipe 104 to thermally expand relative to one another while maintaining sealed connections therebetween.

Figure 2:
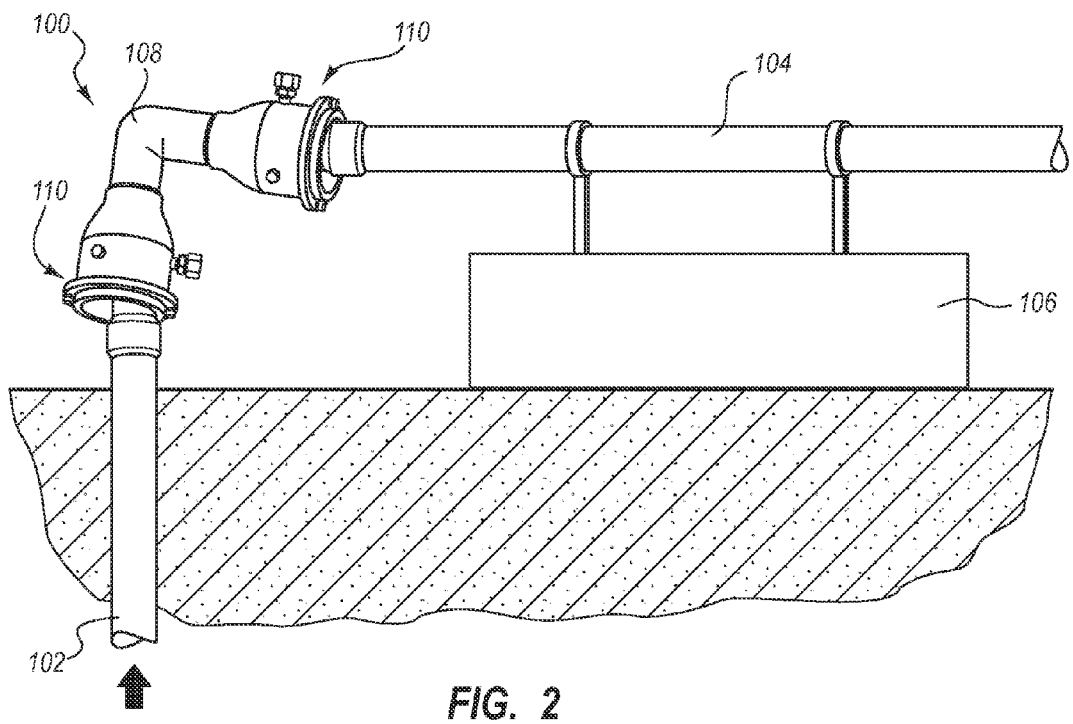
FIG. 2 depicts the fluid system of FIG. 1 with the articulating joints allowing the down-hole pipe to thermally expand while maintaining sealed connections between the down-hole pipe and the fixed surface pipe.

By way of example, FIG. 1 illustrates fluid transfer system 100 before steam has been injected or heated bitumen has been extracted through down-hole pipe 102. As can be seen in FIG. 1, the end of down-hole pipe 102 extends far enough above the surface of the ground to be connected to pipe coupling 110. In contrast, FIG. 2 illustrates fluid transfer system 100 when steam is injected or when heated bitumen is flowing through down-hole pipe 102. Due to the thermal expansion of down-hole pipe 102, the end of down-hole pipe 102 depicted in FIG. 2 extends significantly farther out of the ground than in FIG. 1.

If down-hole pipe 102 and surface pipe 104 were connected together with only elbow pipe 108 and not pipe couplings 110, the expansion of down-hole pipe 102 would likely cause a failure in fluid transfer system 100. Such a failure may include the bending, collapse, or tearing of one or more of pipes 102, 104, and 108. The failure may also include the breakdown of the welds or other connections between elbow pipe 108 and pipe 102 and 104.

Pipe coupling 102 is configured to prevent the failure of fluid transfer system 100 while allowing for the thermal expansion of the pipes. For instance, in the embodiment illustrated in FIGS. 1 and 2, pipe couplings 110 allow for elbow pipe 108 to move relative to down-hole pipe 102 and surface pipe 104 without causing a failure within fluid transfer system 100. More specifically, pipe couplings 110 allow elbow pipe 108 to rotate in a generally clockwise direction as down-hole pipe 102 expands out of the ground. Further, in the illustrated embodiment, elbow pipe 108 rotates about an axis that is generally transverse to the longitudinal axis of down-hole pipe 102 and surface pipe 104.

In the illustrated embodiment, down-hole pipe 102 and surface pipe 104 lie in the same vertical plane. Furthermore, down-hole pipe 102 extends in a generally vertical direction and surface pipe 104 extends in a generally horizontal direction such that the two pipes are generally perpendicular to one another. In order to accommodate this relative orientation, elbow pipe 108 has a bend that is about 90 degrees.

It will be appreciated, however, that fluid transfer system 100 as illustrated in FIGS. 1 and 2 is but one possible configuration of a fluid transfer system that can benefit from pipe coupling 110. The various elements of fluid transfer system 100, including down-hole pipe 102 and surface pipe 104, may be arranged and configured in any manner to meet the requirements of the specific fluid transfer system. By way of example, down-hole pipe 102 may be slant hole drilled so that it extends out of the ground at a non-right angle. In such a configuration, elbow pipe 108 may be formed with an angle that is generally supplementary to the angle down-hole pipe 102 forms with the ground. For instance, if down-hole pipe 102 extended out of the ground at a 30°, elbow pipe 108 could be formed with a bend having an angle of about 150°. While FIGS. 1 and 2 illustrate fluid transfer system 100 having two pipe couplings 110, it will also be appreciated that fluid transfer system 100 can be configured with one or more pipe couplings 102 depending on the needs of fluid transfer system 100. Furthermore, fluid transfer system may employ pipe coupling 110 to couple down-hole pipe 102 and surface pipe 104 to one another without the use of elbow pipe 108. As described in greater detail below, pipe coupling 110 can also allow for down-hole pipe 102 and/or surface pipe 104 to move or expand relative to one another is nearly any direction, not just in the direction illustrated in FIGS. 1 and 2.

Figure 3:
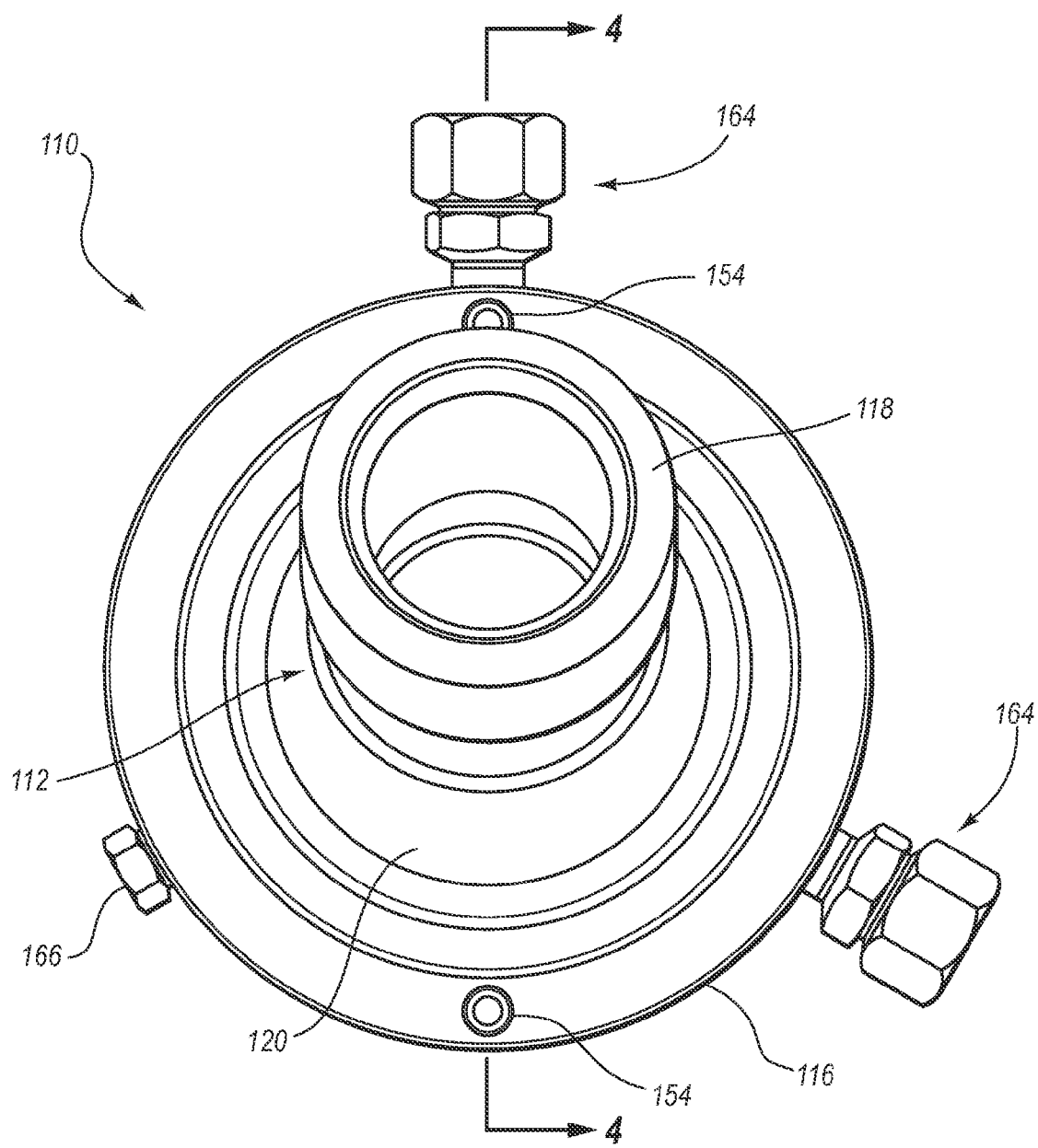
FIG. 3 is an end perspective view of an articulating joint according to an exemplary embodiment of the present invention.
Figure 4:
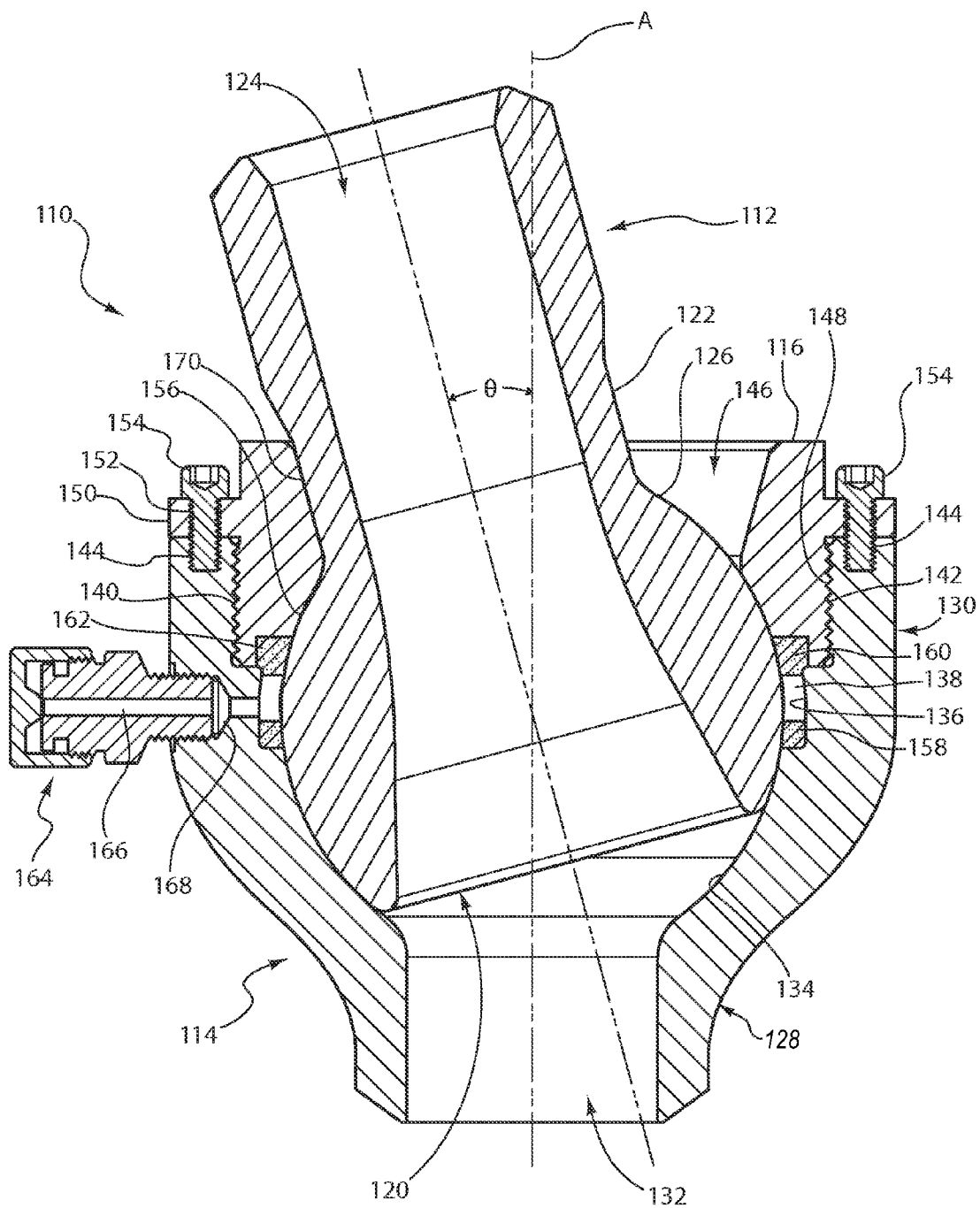
FIG. 4 is a cross-sectional side view of the articulating joint of FIG. 3.

Attention is now directed to FIGS. 3 and 4, which illustrate one exemplary embodiment of a pipe coupling 110 in greater detail. In the illustrated embodiment, pipe coupling 110 includes a first fluid conduit member 112, a second fluid conduit member 114, and a retaining sleeve 116. Generally, first fluid conduit member 112 has an end that is sized and configured to be received within an end of second fluid conduit member 114. Retaining sleeve 116 is adapted to be received about first fluid conduit member 112 and secured at least partially within second conduit member 114 to retain first fluid conduit member 112 within second fluid conduit member 114. In this configuration, pipe coupling 110 generally forms a ball and socket type connection to allow relative movement between first and second fluid conduit members 112 and 114.

As best seen in FIG. 4, first fluid conduit member 112 has a first end 118, a second end 120, a narrowed middle section 122, and a fluid passageway 124 extending therethrough. First end 118 is adapted to be coupled to a pipe of a fluid transfer system to enable fluid to flow through both first fluid conduit member 112 and the attached pipe. For example, first end 118 can be coupled to down-hole pipe 102 or surface pipe 104 of fluid transfer system 100, shown in FIGS. 1 and 2. First end 118 can be coupled to a pipe through any suitable means, including welding, clamps, seals and the like. Additionally, first end 118 can also include a radially extending rim. In such a configuration, first end 118 can be coupled to a pipe that has a similar radially extending rim by securing the rims together. The rims can be secured together with mechanical fasteners, such as clamps or nuts and bolts.

Second end 120 of first fluid conduit member 112 has a spherically enlarged or ball portion 126. Ball portion 126 is received at least partially within second fluid conduit 114. Ball portion 126 enables first fluid conduit member 112 and second fluid conduit 114 to move relative to one another. For instance, ball portion 126 enables 360° rotation of first fluid conduit member 112 relative to second fluid conduit member 114 about a longitudinal axis A of pipe coupling 110. Similarly, ball portion 126 also enables radial movement of first end 118 in all directions. As described below, narrowed middle section 122 enables a greater amount of radial movement of first fluid conduit 112.

Fluid passageway 124 extends through first fluid conduit member 112 to enable fluid to flow through first fluid conduit member 112. At first end 118, fluid passageway 124 is sized and shaped to generally correspond to the size and shape of a fluid conduit in a pipe to which first fluid conduit member 112 is coupled. Within ball portion 126, fluid passageway 124 radially expands so that fluid passageway 124 has a flared or generally conical shape. The widest portion of fluid passageway 124 is at the opening of second end 120, which is inside second fluid conduit member 114 when pipe coupling 110 is assembled. As described below, the flared or conical shape of fluid passageway 124 facilitates the smooth flow of fluid through pipe coupling 110.

Attention is now directed to second fluid conduit member 114. Second fluid conduit member 114 has a first end 128, a second end 130, and fluid passageway 132. First end 128 is adapted to be coupled to a pipe of a fluid transfer system to enable fluid to flow through both second fluid conduit member 114 and the attached pipe. For example, first end 128 can be coupled to down-hole pipe 102 or surface pipe 104 of fluid transfer system 100, shown in FIGS. 1 and 2. First end 128 can be coupled to a pipe through any suitable means, including welding, clamps, seals and the like. Additionally, first end 128 can also include a radially extending rim. In such a configuration, first end 128 can be coupled to a pipe that has a similar radially extending rim by securing the rims together. The rims can be secured together with mechanical fasteners, such as clamps or nuts and bolts.

As best seen in FIG. 4, second end 130 has a larger radius than first end 128 in order to receive ball portion 126 of first fluid conduit member 112. Second end 130 has a rounded interior surface 134 that generally corresponds to the exterior surface of ball portion 126. When first and second fluid conduit members 112 and 114 are coupled together, the exterior surface of ball portion 126 and rounded interior surface 134 cooperate to create a partial seal between first and second fluid conduit members 112 and 114. Furthermore, the exterior surface of ball portion 126 and rounded interior surface 134 facilitate smooth movement between first and second fluid conduit members 112 and 114.

Adjacent rounded interior surface 134, second end 130 includes a first ledge 136. When pipe coupling 110 is fully assembled as shown in FIG. 4, first ledge 136, the exterior surface of ball portion 126, and sleeve 116, cooperate to define a sealing compartment 138, which will be described in greater detail below. Briefly, however, sealing compartment 138 is adapted to receive one or more seals or sealants to prevent fluid flowing through pipe coupling 110 from leaking out between first and second fluid conduit members 112 and 114.

The opening of second end 130 defines a second ledge 140 that includes a threaded portion 142. The opening face of second end 130 also includes one or more threaded bores 144 for receiving bolts. Threaded portion 142 and threaded bores 144 are adapted to facilitate secure coupling of sleeve 116 to second fluid conduit member 114, as described below.

With continuing reference to FIGS. 3 and 4, sleeve 116 will now be described in greater detail. Sleeve 116 is a generally circular shaped member adapted to extend around first fluid conduit member 112 and be coupled to second fluid conduit member 114. When so positioned and secured, sleeve 116 is able to maintain ball portion 126 within second end 130 of second fluid conduit member 114, while still allowing relative movement between first and second fluid conduit members 112 and 114.

Sleeve 116 includes a central opening 146 that is sized to allow first end 118 and narrowed middle section 122 of first fluid conduit member 112 to extend therethrough. Central opening 146 also has a diameter that is smaller than the diameter of ball portion 126. The relative diameters of central opening 146 and ball portion 126 prevent ball portion 126 from being pulled through central opening 146. Thus, when ball portion 126 is positioned within second fluid conduit member 114 and sleeve 116 is secured to second fluid conduit member 114, sleeve 116 prevents ball portion 126 from becoming disengaged from second fluid conduit member 114.

In the illustrated embodiment, sleeve 116 includes a threaded exterior surface 148 that is adapted to engage threaded portion 142 of second fluid conduit member 114. Once ball portion 126 has been inserted into second fluid conduit member 114 and sleeve 116 has been placed around first fluid conduit member 112, sleeve 116 is secured to second fluid conduit member 114. Securing sleeve 116 to second fluid conduit 114 can be accomplished by moving sleeve 116 into engagement with second fluid conduit member 114 and rotating sleeve 116 relative to second fluid conduit member 114. In this manner, threaded exterior surface 148 engages threaded portion 142, which draws sleeve 116 into second fluid conduit member 114.

Once sleeve 116 has been threaded into second fluid conduit member 114, sleeve 116 can be secured in place such that sleeve 116 will not become unthreaded or otherwise disengaged from second fluid conduit member 114. Sleeve 116 includes a rim 150 having one or more apertures 152 extending therethrough. The one or more apertures 152 are adapted to receive one or more bolts 154 therethrough. With sleeve 116 threaded into place, bolts 154 are inserted through apertures 152 and into threaded bores 144. Bolts 154 prevent rotational movement between sleeve 116 and second fluid conduit member 114, which in turn prevents sleeve 116 from becoming disengaged from second fluid conduit member 114.

Securing ball portion 126 within second fluid conduit member 114 with sleeve 116 as described herein provides numerous benefits. For instance, sleeve 116 can be quickly secured to second fluid conduit member 114 because of the threaded engagement therebetween. Furthermore, one or two bolts 154 can hold sleeve 116 in place (i.e., prevent axial rotation of sleeve 116 relative to second fluid conduit member 114). In contrast, typical couplings require up to 10-12 bolts to secure a sleeve in place. Furthermore, the bolts must be tightened in a balanced manner. Thus, assembling a typical pipe coupling can be complex and time consuming.

Central opening 146 of sleeve 116 includes a rounded interior surface 156 which engages the exterior surface of ball portion 126. Rounded interior surface 156 and the exterior surface of ball portion 126 cooperate to create a partial seal between first and second fluid conduit members 112 and 114. Furthermore, the exterior surface of ball portion 126 and rounded interior surface 156 facilitate smooth movement between first and second fluid conduit members 112 and 114.

Central opening 146 of sleeve 116 also includes a chamfer 170. Chamfer 170 and narrowed middle section 122 are configured and cooperate to increase the amount of movement possible between first and second fluid conduit members 112 and 114. More specifically, chamfer 170 is oriented such that chamfer 170 and the exterior surface of narrowed middle section 122 are generally parallel when first end 118 of first fluid conduit member 112 is rotated adjacent to sleeve 116, as illustrated in FIG. 4. Additionally, by narrowing middle section 122, first fluid conduit 112 can be rotated even further towards sleeve 116, thereby increasing the range of motion achievable between first and second fluid conduit members 112 and 114.

By configuring and arranging the components of pipe coupling 110 as described above, first and second fluid conduit members 112 and 114 are able to move relative to one another without becoming disengaged. Furthermore, the components of fluid transfer system 100, such as pipes 102 and 104, coupled to first and second fluid conduit members 112 and 114 are able to move relative to one another as fluid transfer system 100 is heated and cooled.

As noted above, the described configuration of pipe coupling 110 allows 360° rotation between first and second fluid conduit members 112 and 114 about longitudinal axis A. As also noted, the described configuration of pipe coupling 110 allows relative movement between first and second fluid conduit members 112 and 114 in all directions. In other words, one or both of first and second fluid conduit members 112 and 114 can be moved such that a longitudinal axis of one or both of first and second fluid conduit members 112 and 114 forms an angle θ with longitudinal axis A. For instance, the illustrated embodiment of pipe coupling 110 allows first fluid conduit member 112 to be angled at about 15° from longitudinal axis A in any direction. The illustrated embodiment of pipe coupling 110 thus allows for a 30° range of motion relative to longitudinal axis A as well as a 360° range of motion about longitudinal axis A. This allows first and/or second fluid conduit members 112 and 114 to rotate in a full circle around longitudinal axis A. It will be appreciated that pipe coupling 110 can be configured to allow first and/or second fluid conduit members 112 and 114 to move to greater or lesser degrees. For example, the longitudinal axis of first and/or second fluid conduit members 112 and 114 may form an angle with longitudinal axis A that is between about 10° and about 45°.

Attention is briefly directed back to the flared portion of fluid passageway 124 of first fluid conduit member 112. In the illustrated embodiment, the flared portion of fluid passageway 124 is flared at an angle of about 15°, which generally corresponds to the angle formed between the longitudinal axis of first fluid conduit member 112 and longitudinal axis A. Making the flare angle of fluid passageway 124 correspond to angle θ allows fluid to freely and smoothly flow through pipe coupling 110 without obstruction. More specifically, when first fluid conduit 112 is angled as shown in FIG. 4, the opening of fluid passageway 124 does not present any type of obstacle to the flow of material therethrough. Rather, the flared nature of fluid passageway 124 provides a smooth conduit for the flow of material.

As described elsewhere herein, one of the challenges associated with the development of the oil sands is maintaining the integrity of the seals and joints within a fluid transfer system. In particular, as bitumen is extracted it is often mixed with sand and clay. The sand and clay, as well as other materials flowing through the system, cause scoring, corrosion, and erosion of the internal surfaces of the system, including the joints and seals. This internal damage can lead to leaks and/or failure of the fluid transfer system. The repair of leaks or other failures within the fluid transfer system can cause the system to be off-line for several days or more, thereby reducing the production of the system.

Pipe coupling 110 is adapted to prevent such leaks or failures and enable quick repair of leaks without shutting system 100 down. As ball portion 126 rotates within second end 130 of second fluid conduit 114, bitumen, sand, clay, or other materials may be caught between the exterior surface of ball portion 126 and rounded interior surfaces 134 and 156. This can cause scoring or other damage between these surfaces that may allow fluid to leak between first and second fluid conduit members 112 and 114. Despite the possible formation of such leaks, pipe coupling 110 includes seals and associated mechanisms that mitigate any developing leaks and allows any leaks to be quickly repaired without taking fluid transfer system 100 off-line.

As noted above, pipe coupling 110 includes a sealing compartment 138 that assists in preventing and repairing leaks between first and second fluid conduit members 112 and 114. Sealing compartment 138 is adapted to receive first and second seals or packing materials 158 and 160 therein. In the illustrated embodiment, first packing material 158 is positioned on first ledge 136 adjacent rounded interior surface 134. First packing material 158 is compressed between first ledge 136 and ball portion 126. Second packing material 160 is compressed between first ledge 136, the exterior surface of ball portion 126, and a groove 162 in sleeve 116. In these positions, first and second packing materials 158 and 160 are adapted to limit or prevent fluid from leaking between the exterior surface of ball portion and rounded interior surfaces 134 and 156.

Any suitable material can be used for first and second seals or packing materials 158 and 160. By way of non-limiting example, packing materials 158 and 160 can formed of an INCONEL reinforced graphite material. INCONEL is a family of austenitic nickel-chromium-based superalloys. For instance, packing materials 158 and 160 can be formed of a braided, low-sulfur expanded graphite yarn, which is reinforced with INCONEL wire. This type of material retains the benefits of pure graphite packing, such as good thermal and chemical resistance, very low friction, and provides great mechanical strength. Additionally, INCONEL reinforced graphite can include a corrosion inhibitor that acts as a sacrificial anode to protect the adjacent components.

In addition to providing quality sealing functionality, INCONEL reinforced graphite materials provides additional benefits. One of these benefits is its ability to withstand extreme temperatures, which enables pipe coupling 110 to be installed when pipe coupling is pre-assembled. In particular, to install pipe coupling 110, first ends 118 and 128 are typically welded to adjacent pipes. If packing materials 158 and 160 cannot withstand the high temperatures associated with welding, they may be damaged or compromised during the welding process. INCONEL reinforced graphite materials, however, can withstand the high temperatures associated with welding. Thus, pipe coupling 110 can be pre-assembled and then installed without compromising the integrity of packing materials 158 and 160.

As noted throughout this description, pipe coupling 110 allows leaks to be remedied without taking fluid transfer system 100 off-line or completely disassembling pipe coupling 110. For instance, one manner of remedying a leak between first and second fluid conduit members 112 and 114 is to remove bolts 154 and rotate sleeve 116 relative to second fluid conduit member 114. This will further compress packing materials 158 and 160 within sealing compartment 138, which can prevent additional leakage. Once sleeve 116 has been rotated to the desired positioned, bolts 154 can be reinserted to prevent sleeve 116 from becoming partially or completely unthreaded from second fluid conduit member 114.

A second method of remedying a leak between first and second fluid conduit members 112 and 114 is to use a high pressure injection gun to inject additional packing material into sealing compartment 138. As can be seen in FIG. 4, sealing compartment 138 also includes a void or open area between first and second packing materials 158 and 160. In fluid communication with this open area in sealing compartment 138 is an injector port 164. Injector port 164 extends through second end 130 of second fluid conduit 114 and enables additional packing material to be injected into sealing compartment 138. Injector port 164 can include a channel 166 through which the additional packing material can be injected. Injector port 164 also includes a check valve 168 that prevents fluid or packing material that is within sealing compartment 138 from escaping or leaking out of injector port 164. While the illustrated embodiment of pipe coupling 110 includes two injector ports 164, it will be understood that pipe coupling 110 can include one or more injector ports 164.

In order to prevent or stop of leak using injector port 164, a high pressure injector gun is connected to injector port 164 and additional packing material is injected into sealing compartment 138. This can be done while pipe coupling 110 is still on-line and has fluid flowing therethrough. Since fluid transfer system 100 may be under pressure, an injector gun used to inject additional packing material will need to be able to inject the additional packing material at a higher pressure than the line pressure within system 100. Injector port 164 or the injector gun can be equipped with a pressure gauge to determine the pressure within system 100 and ensure that the pressure within sealing compartment 138 is at least as high as the system pressure.

Any suitable material can be used for the additional injectable packing material. By way of non-limiting example, the additional packing material can be a moldable plastic type packing putty with additional graphite particles and non-organic thickeners. Such a material can fill any voids in packing materials 168 and 160, as well as fill any scores or corroded areas within pipe coupling 110. The material can also entirely fill the void in sealing compartment 138. In this manner, the injected packing material can fill any areas through which fluid is leaking out of pipe coupling 110.

In addition to injector port 164, second fluid conduit member 114 can also include a release valve 166 and associated plug. As seen in FIG. 3, release valve 166 is circumferentially offset from injector port 164. In the illustrated embodiment, release valve 166 is offset from both injector ports 164 by about 120°. It will be appreciated, however, that release valve 166 can be circumferentially offset from injector port 164 at other angles, such as 180°, 90°, and 45°, for example.

Release valve 166 is adapted to assist maintenance personnel when injecting additional packing material into sealing compartment 138. For instance, if a leak is detected in pipe coupling 110, additional packing material can be injected into sealing compartment 138, as described above. As the additional packing material flows through and fills the void in sealing compartment 138, excess packing material can escape from sealing compartment 138 through release valve 166. The excess packing material escaping from release valve 166 provides a visual indication to the maintenance personnel that sealing compartment 138 has been completely filled with the injected packing material.

Each time a leak is discovered in a typical fluid transfer system, the system is taken off line, allowed to cool, and the leaking joint or seal is disassembled and either replaced or repaired. In contrast, injector port 164 allows pipe coupling 110 to remain on-line even if a leak is discovered. Rather than taking the system off-line each time a leak forms, additional packing material is simply injected into sealing compartment 138. This can be done numerous times to prevent or repair leaks. This can significantly reduce the amount of down time required to repair a leak. The less down time required to maintain the system results in increased production.

If packing materials 158 and 160 eventually become so worn that injecting additional packing material through injector port 164 is insufficient to stop a leak, the configuration of second fluid conduit member 114 and sleeve 116 enable packing materials 158 and 160 to be replaced much more quickly than packing materials in a typical coupling. Typical couplings include 10 to 12 bolts that must be removed to gain access to the packing material. Once the packing materials are replaced, the 10-12 bolts must then be replaced in a balanced manner. The process of disassembling a typical coupling, replacing the packing materials, and reassembling the coupling can take several hours. Additionally, the components of typical couplings are much heavier than those of pipe coupling 110. A typical coupling can weigh 120 pounds. Thus, replacing the entirely coupling is very difficult.

In contrast, pipe coupling 110 can be formed to weigh about 50 pounds. Additionally, pipe coupling 110 can have as few as one or two bolts that must be removed to provide access to packing materials 158 and 160. For instance, to replace packing materials 158 and 160, sleeve 116 is disengaged from second fluid conduit member 114 by removing bolts 154 and unscrewing sleeve 116 from second fluid conduit member 114. Old packing materials 158 and 160 can then be replaced with new packing materials 158 and 160. Sleeve 116 can then be re-secured to second fluid conduit member 114 and the system can be put back on-line. This process can be done in a matter of minutes rather than hours. Thus, even when pipe coupling 110 must be disassembled, the down time is significantly less than with a typical coupling.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pipe coupling, comprising:
   a first fluid conduit member having a first end coupleable to an end of a pipe, a second end having a spherically enlarged portion, and a flared fluid passageway extending therethrough, the flared fluid passageway having a first diameter adjacent the first end and a second diameter adjacent the second end, the first diameter being smaller than the second diameter;
   a second fluid conduit member having a first end coupleable to an end of a pipe, a second end that receives the spherically enlarged portion at least partially therein, and a fluid passageway extending therethrough, said second end of said second fluid conduit member having an interior surface having a ledge formed therein and a rounded interior surface portion that generally corresponds to the shape of said spherically enlarged portion of said first fluid conduit;
   a sleeve having a central opening for receiving said first end of said first fluid conduit member therethrough, said sleeve being engageable with said second fluid conduit member to secure said spherically enlarged portion within said second end of said second fluid conduit member;
   a sealing compartment defined at least partially by said spherically enlarged portion and said ledge;
   first and second packing materials disposed within said sealing compartment, wherein said first packing material is compressed between said spherically enlarged portion and said ledge to prevent leaks between said first and second fluid conduit members; and
   an injector port that is in fluid communication with said sealing compartment to facilitate injection of additional packing material into said sealing compartment to prevent and repair leaks.

2. A pipe coupling as recited in claim 1, wherein said injector port comprises a check valve to prevent leakage out of said injector port.

3. A pipe coupling as recited in claim 1, wherein said sleeve has a rounded interior surface that generally corresponds to an exterior surface of said spherically enlarged portion.

4. A pipe coupling as recited in claim 1, wherein said sleeve has a groove formed therein, wherein said groove cooperates with said spherically enlarged portion and said ledge to define said sealing compartment.

5. A pipe coupling as recited in claim 4, wherein said second packing material is compressed between said spherically enlarged portion, said ledge, and said groove to prevent leaks between said first and second fluid conduit members.

6. A pipe coupling as recited in claim 5, wherein said first and second packing materials are formed of an Inconel reinforced graphite reinforced with one or more austenitic nickel-chromium-based superalloys.

7. A pipe coupling as recited in claim 5, wherein said injector port selectively injects said additional packing material into said sealing compartment between said first and second packing materials.

8. A pipe coupling as recited in claim 1, wherein said injector port selectively injects a moldable plastic packing putty into said sealing compartment.

9. A pipe coupling as recited in claim 1, wherein said second fluid conduit member further comprises a release valve in fluid communication with said sealing compartment.

10. A pipe coupling for connecting a first pipe to a second pipe to allow for relative movement between the first pipe and the second pipe while maintaining a sealed fluid passageway therethrough, the pipe coupling comprising:
    a first fluid conduit member selectively coupleable to the first pipe, said first fluid conduit member having a ball portion and a fluid passageway extending therethrough;
    a second fluid conduit member selectively coupleable to the second pipe, said second fluid conduit member having a fluid passageway extending therethrough and an enlarged end that selectively receives said ball portion, said enlarged end having a rounded interior surface that generally corresponds to the shape of the ball portion of the first fluid conduit;
    a sleeve that selectively extends about said first fluid conduit member, said sleeve being engageable to said enlarged end to secure said ball portion within said enlarged end, said sleeve also having a rounded interior surface that generally corresponds to the shape of the ball portion of the first fluid conduit, wherein the rounded interior surface of the sleeve is space apart from the rounded interior surface of the second fluid conduit member;
    a sealing compartment disposed between the rounded interior surface of the sleeve and the rounded interior surface of the second fluid conduit member, the sealing compartment being defined by said enlarged end, said ball portion, and said sleeve, wherein said sealing compartment has packing material disposed therein to prevent leaks between said first and second fluid conduit members and to allow for leak repair between the first and second fluid conduit members; and an injector port that is in fluid communication with said sealing compartment to facilitate injection of packing material into said sealing compartment to prevent and repair leaks.

11. A pipe coupling as recited in claim 10, wherein packing material can be repeatedly injected into said sealing compartment to stop leaks between said first and second fluid conduit members.

12. A pipe coupling as recited in claim 10, where said second fluid conduit member comprises a ledge formed between a threaded portion and said rounded interior surface, wherein a first packing material is compressed between said ledge and said ball portion.

13. A pipe coupling as recited in claim 12, wherein said sleeve comprises a groove, wherein a second packing material is compressed between said groove, said ledge, and said ball portion.

14. A pipe coupling as recited in claim 13, where said wherein said first packing material and said second packing material are space apart, thereby creating a void in said sealing compartment.

15. A pipe coupling as recited in claim 10, wherein said first fluid conduit member selectively moves relative to said second fluid conduit member such that a longitudinal axis of said first fluid conduit member forms an angle with a longitudinal axis of said second fluid conduit member.

16. A pipe coupling as recited in claim 15, wherein said angle is between about 10° and about 30°.

17. A pipe coupling as recited in claim 10, wherein said enlarged end of said second fluid conduit member further comprises a threaded bore and said sleeve comprises a radially extending rim having an aperture extending therethrough, wherein said aperture and said threaded bore selectively receive a bolt to prevent axial movement of said sleeve relative to said second fluid conduit member.

18. A pipe coupling, comprising:
a first fluid conduit member that selectively communicates fluid therethrough and has a first end that is selectively coupleable to a pipe in a fluid transfer system, a narrowed middle section, and a second end having a spherically enlarged ball portion;
a sleeve having a central opening with a diameter larger than a diameter of said first end and said narrowed middle section of said first fluid conduit member and smaller than a diameter of said spherically enlarged ball portion, said central opening having an annular groove formed therein, a portion of said central opening adjacent said annular groove generally corresponding to the shape of said spherically enlarged ball portion, said central opening also having a chamfer that cooperates with said narrowed middle section to facilitate a wide range of motion of said first fluid conduit member within said sleeve, wherein said annular groove and said chamfer are separated by said portion of said central opening that generally corresponds to the shape of said spherically enlarged ball portion, said sleeve further having a threaded portion and a radially extending rim having an aperture extending therethrough;
a second fluid conduit member that selectively communicates fluid therethrough and has a first end that is selectively coupleable to a second pipe in the fluid transfer system, a second end that selectively receives said spherically enlarged ball portion therein, wherein said second end comprises a rounded interior surface that generally corresponds to the shape of said spherically enlarged ball portion, a ledge formed on an interior surface, a threaded portion that selectively engages said threaded portion of said sleeve to couple said sleeve to said second fluid conduit member, and a threaded bore, wherein said threaded bore and said aperture of said sleeve selectively receive a bolt therein to prevent axial movement of said sleeve and said second fluid conduit member relative to one another, and wherein said ledge separates said rounded interior surface and said threaded portion;
a sealing compartment defined by said spherically enlarged ball portion, said ledge of said of said second fluid conduit member, and said annular groove of said sleeve, wherein said sealing compartment has packing material disposed therein to prevent leaks between said first and second fluid conduit members and to allow for leak repair between the first and second fluid conduit members; and
an injector port associated with said second fluid conduit member, said injector port having a check valve and a channel extending therethrough, said channel having an end that opens directly into and is in fluid communication with said sealing compartment, wherein said injector port facilitates injection of additional packing material directly into said sealing compartment to prevent and repair leaks.

19. A pipe coupling as recited in claim 18, wherein said injector port facilitates injection of said packing material into said sealing compartment at a pressure greater than a line pressure within the pipe coupling.

20. A pipe coupling as recited in claim 18, further comprising a release valve associated with said second fluid conduit member, said release valve being in fluid communication with said sealing compartment such that excess packing material injected into said sealing compartment can escape through said release valve.

* * * * *